United States Patent
Shin et al.

(10) Patent No.: US 9,335,576 B2
(45) Date of Patent: May 10, 2016

(54) LIQUID CRYSTAL DISPLAY DEVICE MODULE

(71) Applicant: LG DISPLAY CO., LTD., Seoul (KR)

(72) Inventors: JaeWon Shin, Paju-si (KR); Wook Jeon, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 142 days.

(21) Appl. No.: 13/648,974

(22) Filed: Oct. 10, 2012

(65) Prior Publication Data

US 2013/0088661 A1    Apr. 11, 2013

(30) Foreign Application Priority Data

Oct. 10, 2011 (KR) ........................ 10-2011-0103297

(51) Int. Cl.
    *G02F 1/1333*      (2006.01)
    *G02F 1/1335*      (2006.01)

(52) U.S. Cl.
    CPC .... *G02F 1/133308* (2013.01); *G02F 1/133608* (2013.01); *G02F 2001/133314* (2013.01)

(58) Field of Classification Search
    CPC .............................................. G02F 1/133615
    USPC .................................................. 349/58–62
    See application file for complete search history.

(56) References Cited

U.S. PATENT DOCUMENTS

| | | |
|---|---|---|
| 2001/0050732 A1 | 12/2001 | Okamoto et al. |
| 2002/0008806 A1 | 1/2002 | Natsuyama |
| 2006/0072050 A1 | 4/2006 | Lee |
| 2006/0221268 A1* | 10/2006 | Ko ......................... G02B 6/0018 349/58 |
| 2007/0222911 A1* | 9/2007 | Murase ............... G02F 1/13452 349/58 |
| 2010/0265722 A1* | 10/2010 | Sohn ....................... F21V 15/01 362/311.02 |
| 2010/0328966 A1* | 12/2010 | Shin .................. G02F 1/133605 362/609 |
| 2012/0057096 A1 | 3/2012 | Kuromizu |

FOREIGN PATENT DOCUMENTS

| | | |
|---|---|---|
| CN | 101688988 A | 3/2010 |
| CN | 101957506 A | 1/2011 |
| JP | 2001-22291 A | 1/2001 |
| JP | 2001-83900 A | 3/2001 |
| JP | 2001-356321 A | 12/2001 |
| JP | 2002-42535 A | 2/2002 |
| JP | 2003-50549 A | 2/2003 |
| JP | 2005-55736 A | 3/2005 |
| JP | 2005-195613 A | 7/2005 |
| JP | 2005-241964 A | 9/2005 |
| JP | 2010-76857 A | 4/2010 |
| JP | 2010-276857 A | 12/2010 |
| JP | 2011-95533 A | 5/2011 |
| WO | WO 2010/140413 A1 | 12/2010 |

* cited by examiner

*Primary Examiner* — Paisley L Arendt
*Assistant Examiner* — Agnes Dobrowolski
(74) *Attorney, Agent, or Firm* — Birch, Stewart, Kolasch & Birch, LLP

(57) ABSTRACT

A liquid crystal display (LCD) device module includes a liquid crystal (LC) panel; a backlight unit disposed on a rear surface of the LC panel; a cover bottom where the LC panel and the backlight unit are mounted; a plurality of guide panels coupled to side surfaces of the cover bottom, and configured to support four side ends of the LC panel below the LC panel; and a case top configured to enclose outer surfaces of the guide panels.

11 Claims, 4 Drawing Sheets

LIQUID CRYSTAL DISPLAY DEVICE MODULE

CROSS-REFERENCE TO RELATED APPLICATION

Pursuant to 35 U.S.C. §119(a), this application claims the benefit of earlier filing date and right of priority to Korean Application No. 10-2011-0103297, filed on Oct. 10, 2011, the contents of which is incorporated by reference herein in its entirety.

BACKGROUND OF THE INVENTION

1. Field of the Invention

The present invention relates to a liquid crystal display (LCD) device module, and particularly, to an LCD device module capable of simplifying a mechanical structure where an LC panel and a backlight unit are mounted, of maintaining strength, and of implementing a narrow bezel type 2. Background of the Invention Recently, many types of portable devices such as a mobile phone and a notebook computer, and information electronic devices such as HDTV for implementing high resolution and high quality are being developed. According to this trend, demands for flat panel display (FPD) devices applied to such devices increase. The FPD device includes an LCD (Liquid Crystal Display), a PDP (Plasma Display Panel), an FED (Field Emission Display), and an OLED (Organic Light Emitting Diodes), etc. Among such FPD devices, the LCD device is being spotlighted due to massive production, easy driving, high-definition quality and a large screen.

The LCD device uses a principle of a passive type transmission display element, which displays gray scale of a desired image by controlling the amount of light passing through an LC layer, by refractive anisotropy of LC molecules. Therefore, the LCD device is provided with a backlight unit for providing light to the LC layer for image display. The backlight unit is categorized into two types according to a structure of an optical source.

One is a direct type backlight unit where a lamp (optical source) is disposed on a rear surface of an LCD panel, and light is directly irradiated to the LCD panel from the lower side. Another is an edge type backlight unit where a lamp is disposed on a side surface of the LCD panel, and light undergoes a progress direction change towards the LCD panel through an optical sheet, etc.

In the direct type backlight unit, light emitted from the lamp is directly supplied to the LCD panel. Accordingly, the direct type backlight unit can be applied to an LCD panel of a large screen, and can implement high brightness. Owing to these advantages, the direct type backlight unit is applied to an LCD panel for TV of a large screen.

On the other hand, in the edge type backlight unit, a lamp is installed on a side surface of the LCD panel, and provides light to the LCD panel through an optical sheet (i.e., reflection plate and light guide plate). This may cause a difficulty in applying the edge type backlight unit to an LCD panel of a large screen, and in implementing high brightness since light is supplied through the light guide plate. However, it is advantageous that the LCD device module has a small thickness since the backlight unit is disposed on the side surface of the LCD panel. Accordingly, the edge type backlight unit is mainly applied to an LCD device of a portable apparatus requiring a thin display device.

FIG. 1 is a sectional view of a liquid crystal display (LCD) device module having a direct type backlight unit provided with a light emitting diode (LED) in accordance with the conventional art.

As shown in FIG. 1, the conventional LCD device module comprises an LCD panel 10 for displaying images, a backlight unit 20 for providing light to the LCD panel 10, and a mechanical structure 30 for modularizing the LCD panel 10 and the backlight unit 20.

The LCD panel 10 has a structure where an LC layer is interposed between two substrates facing each other and to be attached to each other. As a signal is applied to the LCD panel 10 from a driver unit, light transmittance of the LC layer is controlled to implement image display.

The backlight unit 20 is disposed on the rear surface of the LCD panel 10, and includes a plurality of LED PKGs (packages) 21, an LED substrate 22 on which the LED PKGs 21 are bonded, a double-side tape member 23 for insulating the rear surface of the LED substrate 22 and a mechanical structure 30 disposed therebelow from each other and fixing the LED substrate 22, and a reflection plate disposed above the LED substrate 22, and configured to expose the LED PKGs therethrough. And, the backlight unit 20 includes a diffusion sheet 27 disposed above the reflection plate 26 and diffusing light emitted from the LED PKGs 21 to an entire region of the LCD panel 10, and a prism sheet 28 disposed on the diffusion sheet 27.

The mechanical structure 30 includes a guide panel 31, a side supporter 35 and a cover bottom 37. More specifically, the guide panel 31 mounts the LCD panel 10 at an inner stair-stepped portion, and guides each edge of the LCD panel 10. The guide panel 31 may be formed of white synthetic resin having high reflectivity so as to inward reflect light emitted from the LED PKGs 21.

The case top 33 is coupled to an upper unit of the LCD panel 10, and fixes the LCD panel 10 together with the guide panel 31. And, the case top 33 encloses the front surface and the side surfaces of the guide panel 31.

The side supporter 35 is disposed below the guide panel 31 thus to be coupled to a cover bottom 37 to be later explained, and allows a distance between the optical sheets 27 and 28 and the LED lamp 21, by supporting the optical sheets 27 and 28 of the backlight unit 20.

On an inner bottom surface of the cover bottom 37, the LED substrate 22 of the backlight unit 20 is mounted. And, the cover bottom 37 is coupled to the guide panel 31 and the case top 33.

In such LCD device module, a non-display region where no image is displayed is stably fixed by the guide panel 31 and the case top 33. And, the non-display region is a minimum margin occupied by the side supporter 35 on the rear surface of the diffusion sheet 27, which is designed to have a width (a) of about 28.3 mm~34.2 mm.

However, a recent LCD device is designed to so that the non-display region (bezel portion) has a minimized width (a) for implementation of a narrow bezel type. Furthermore, it is limited to reduce the width of the non-display region due to a required minimized margin.

Especially, in the conventional LCD module, the cover bottom 31 is formed to have four side surfaces coupled to the guide panel 31, by upward bending each side surface of a single metallic plate. This may cause deformation or transformation of the cover bottom 31.

SUMMARY OF THE INVENTION

Therefore, an aspect of the detailed description is to provide a liquid crystal display (LCD) device module capable of maintaining the same strength as the conventional one, and capable of implementing a narrow bezel portion by changing a shape and a coupling method of a mechanical structure in a direct type LCD device module.

Another aspect of the detailed description is to provide a liquid crystal display (LCD) device module capable of minimizing deformation or transformation of a cover bottom formed to have bent side surfaces.

To achieve these and other advantages and in accordance with the purpose of this specification, as embodied and broadly described herein, there is provided a liquid crystal display (LCD) device module, comprising: a liquid crystal display (LCD) pane having a light emitting surface and a rear surface; a backlight unit disposed on a rear surface side of the LCD panel and including an LED substrate on which LEDs are mounted; a cover bottom on which the LED substrate is mounted; a plurality of guide panels coupled to peripheral edges of a rear surface of the cover bottom and supporting peripheral edges of the rear surface of the LCD panel; and a case top enclosing outer surfaces of the guide panels and covering the peripheral edges of the emitting surface of the LCD panel.

The guide panels may include: a first blade unit on which the LCD panel is placed and whose side surfaces are disposed vertically to the cover bottom to support each peripheral edge of the LCD panel; and a second blade unit extended from the first blade unit and bent inward the LCD device module to couple a rear surface of the cover bottom.

An inner peripheral edge of an upper surface of the case top may be positioned outer than an inner side surface of the first blade.

An inner side surface of an upper section of the first blade may be positioned outer than an inner side surface of an lower section of the first blade.

An upper inner side surface of the first blade may be provided with a step, and a peripheral edge of the LCD panel is arranged over the step.

The first blade unit may have at least one hole on a side surface thereof for insertion-coupling with the case top.

The LCD device module may further comprise a plurality of coupling members, each coupling member inserted into a gap between the ends of the two guide panels to fix neighboring guide panels.

Upper surfaces of both ends of the first blade unit may have concave convex groove, and wherein the coupling member may include: a body unit in a straight-line shape; a plurality of first branch units perpendicularly extended from one end of the body unit and fitted into the concave-convex grooves of the first blade units; and a plurality of second branch units perpendicularly extended from another end of the body unit, and the second branch unit being formed at lower portion thereof to couple with the cover bottom.

The cover bottom may have protrusion units outward protruding from each corner, and each protrusion unit is formed with grooves for inserting the second branch units.

An upper surface of the case top may have a width of 1.5 mm~2.5 mm.

An overlapped area of the LCD panel and the case top may be 40%~50% of an area of the upper surface of the case top.

The backlight unit may include: a plurality of LED PKGs (Light Emitting Diode Packages); the LED substrate on which the LED PKGs are mounted; a reflection plate disposed above the LED substrate the reflection plate having a plurality of holes to expose the LED PKGs there through; and an optical sheet for diffusing and collecting light emitted from the LED PKGs, wherein the optical sheet may be disposed on a rear surface of the LCD panel and supported by steps provided on upper inner surfaces of the guide panels.

The LCD device module of the present invention may have the following effects.

Firstly, the guide panels where the LCD panel is mounted are formed to have a straight-line shape so as to be coupled to the cover bottom. This can allow the conventional side supporter for supporting the guide panels not to be required while maintaining strength of the LCD device module. As a result, the LCD device module can implement a narrow bezel portion while maintaining the same strength as the conventional one.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a unit of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a liquid crystal display (LCD) device module according to the present invention will be explained in more details with reference to the attached drawings.

Figure 2:
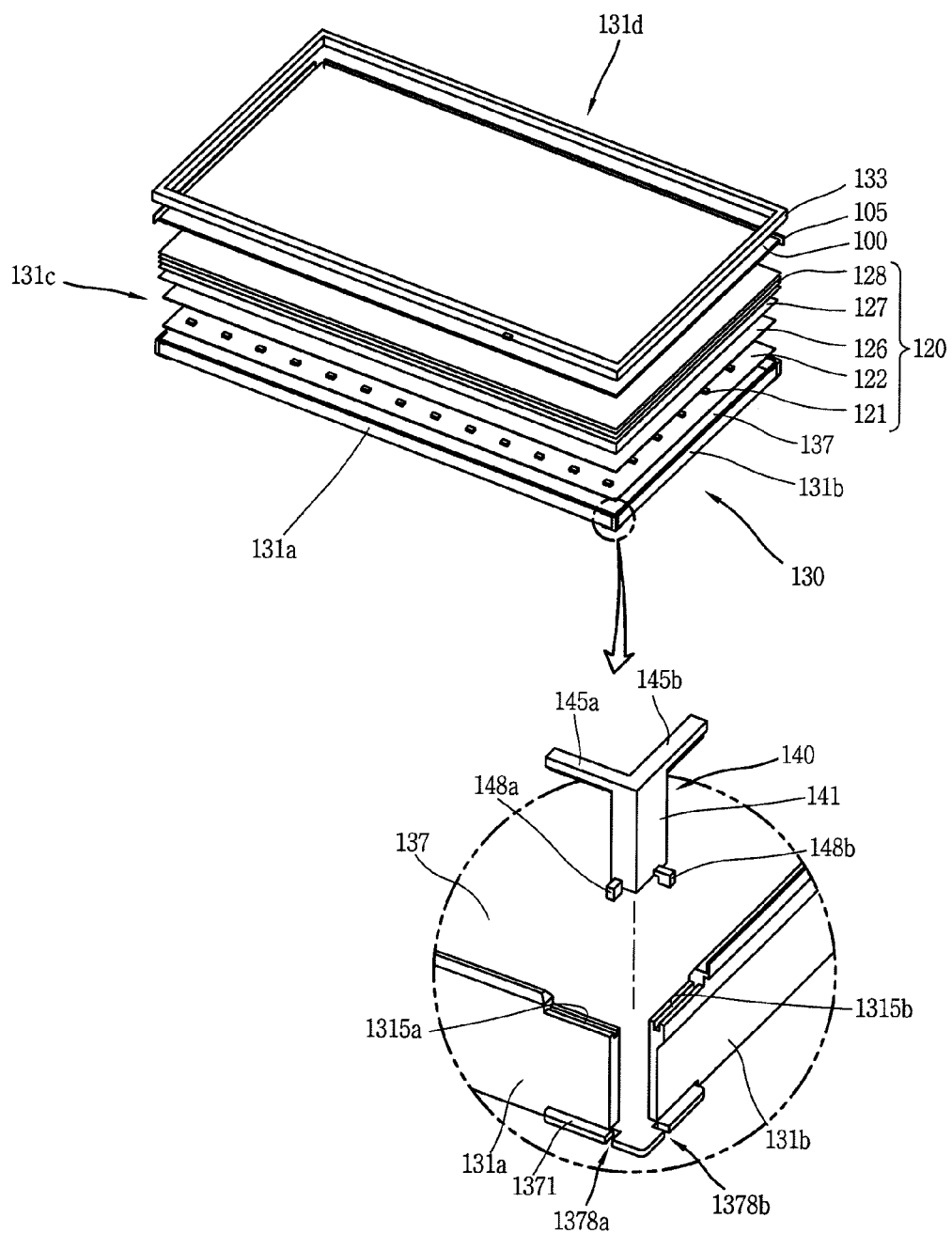
FIG. 2 is a view showing a single guide panel of an LCD device module according to an embodiment of the present invention.

FIG. 2 is a disassembled perspective view of an LCD device module according to an embodiment of the present invention.

As shown, the LCD device module of the present invention comprises an LCD panel 100 for displaying images, a backlight unit 120 for providing light to the LCD panel 100, and a mechanical structure 130 for modularizing the LCD panel 100 and the backlight unit 120. Hereafter, the term "upper unit/surface/part" refer to the upper along the light emitting direction, while the term "under/lower unit/surface/part" refer to the opposite thereto. Also, the term "rear surface" of each member refers to the opposite surface of the light emitting surface. Further, the term "inner/inward" and "outer/ outward" refer to the position with respect to the center of the display region of the LCD panel 100.

More specifically, the LCD panel 100 includes two substrates to be bonded to each other, and an LC layer interposed between the two substrates. And, the LCD panel 100 is configured to display images under control of a driver unit 105 additionally provided. Not only a switching device, but also many types of wires and electrodes for signal transfer are formed on the lower substrate of the two substrates. The upper substrate facing the lower substrate is a color filter substrate for displaying RGB colors. On the upper substrate, a color filter layer and a black matrix (BM) are formed. The driver unit 105 is attached to at least one side surface of the LCD panel 100 thus to be electrically connected thereto, in a state where a gate and data driver IC for providing a gate signal and a data signal to control the switching device has been bonded on a PCB.

The LCD panel 100 will be explained in more details. A plurality of gate lines and data lines are disposed in horizontal and vertical directions to define a plurality of pixel regions. A switching element, a thin film transistor (TFT) is formed on each pixel region. The TFT includes a gate electrode connected to a gate line, an active layer formed as an amorphous silicon is laminated on the gate electrode, and a source electrode and a drain electrode formed on the active layer and electrically connected to the data line and the pixel electrode. The pixel electrode is arranged to be alternate with a common electrode.

The upper substrate includes a color filter comprised of a plurality of sub color filters for implementing red, green and blue (RGB), and a black matrix (BM) for unititioning the sub color filters from each other and blocking light having passed through the LC layer.

The two substrates are attached to each other by a sealant formed on an outer periphery of a display region, thereby constituting the LCD panel 100. A polarizer is attached to an outer side surface of the LCD panel 100, thereby polarizing light having gray scale after being incident onto the LCD panel 100 and passing through the LC layer.

A driver unit 105 for controlling the LCD panel 100 is provided on at least one side surface of the LCD panel 100. The driver unit 105 includes a gate and data driver IC for driving the LCD panel 100. The driver IC is electrically connected to the LCD panel 100 by a TAB (Tape Automated Bonding) film, etc. When the LCD panel 100 is mounted to guide panels 131a~131d to be later explained, the TAB film is folded toward the outside of the guide panels 131a~131a, thus to be positioned on the side surface of the LCD panel 100.

A backlight unit 120 provides light to the LCD panel 100, and includes a point light source and a plurality of optical sheets for providing light emitted from the point light source to the LCD panel 100 through optical compensation. And, the backlight unit 120 is disposed under the rear surface of the LCD panel 100.

The point light source includes a plurality of LED PKGs 121. The LED PKGs 121 are provided with at least one LED semiconductor device mounted therein, and are bonded on an LED substrate 122.

The optical sheets are spaced from the LED PKGs 121 by a preset distance, and are disposed to face a light emitting surface. The optical sheets for efficiently providing light to the LCD panel 100 may include a diffusion sheet and a prism sheet. The diffusion sheet 127 serves to diffuse light emitted from the LED PKGs 121 to the entire region of the LCD panel 100, not to concentrate the light to a specific region. And, the prism sheets 128 upward collects light diffused by the diffusion sheet, thereby uniformly providing the light to the entire region of the LCD panel 100. Generally, the diffusion sheet 127 is implemented as a single diffusion sheet. However, the prism sheets 128 may be provided with a first prism sheet and a second prism sheet crossing each other in X and Y directions, so that light can be refracted to upward straightly move. The number of the diffusion sheet and the prism sheet, and the arrangements thereof may be variable by a designer's intention.

A reflection plate 126 is provided below the optical sheet and above the LED substrate 122, thereby reflecting light emitted towards a cover bottom 137 (i.e., light emitted opposite to the LCD panel 100) and progressing the reflected light to the LCD panel 100. To this end, holes are formed on the reflection plate 126 in correspondence to the LED PKGs 121. The LED PKGs 121 are exposed to the upside of the reflection plate 126 via the holes.

The LCD panel 100 and the backlight unit 120 are supported and fixed by the mechanical structure 130.

The guide panels 131a~131d for supporting the rear surface of the LCD panel 100 is provided in four in correspondence to the side surfaces of the LCD panel 100. That is, the guide panels 131a~131d support, on their upper surfaces, the peripheral edges of the LCD panel 100. The upper parts of the guide panels 131a~131d are inward stepped, on which the peripheral edges of the rear surface of the LCD panel 100 are placed. The guide panels 131a~131d have an 'L'-shaped sectional view and the upper surfaces of the L-shaped sections are coupled to the rear surface of the cover bottom 137, thereby forming four side surfaces of the LCD device module.

The guide panels 131a~131d are formed of a metallic material, not the conventional resin material. When compared with the conventional guide panel 131, the guide panels 131a~131d can maintain strength while maintaining each side end of the LCD panel 100, despite of a narrow width of stepped portions therein. And, the guide panels 131a~131d are disposed on the four side surfaces of the cover bottom 137, and connected by a coupling member (140) each other at each corner. A detailed structure of such guide panels will be later explained.

The end of a first guide panel 131a faces the end of a second guide panel 131b at each corner of the cover bottom 137 in a non-contact manner. A plurality of coupling members 140 for fixing the neighboring first and second guide panels 131a and 131b are inserted into the gap between the first and second guide panels 131a and 131b.

The guide coupling members 140 serve to fill the gap between the first and second guide panels 131a and 131b. The coupling member 140 includes a body unit 141 formed in a straight-line shape vertical to the bottom case 137, and a plurality of first branch units 145a and 145b perpendicularly upward-extending from the body unit 141 and fitted into concave-convex grooves 1315a and 1315b of the upper surfaces of the guide panels 131a and 131b. Here, the first branch units 145a and 145b are formed to have an angle of 90°.

The coupling member 140 includes a plurality of second branch units 148a and 148b perpendicularly downward-extending from the body unit 141 and having protrusions inserted into grooves of the cover bottom 137.

The coupling member 140 for guiding the guide panels 131a~131d, respectively may be formed of resin, and supports or fixes each corner of the LCD device module.

A case top 133 is coupled to the upper unit of the guide panels 131a~131d having the LCD panel 100 mounted thereon, thereby stably supporting the LCD panel 100 against an impact applied from the outside. A plurality of holes are formed on the side surface of the case top 133, and the side surface of the case top 133 may be insertion-coupled (for example, screw-coupled) to the side surface of the guide panel via the holes.

The cover bottom 137 is a mechanical structure corresponding to a lower unit of the LCD device module, and has peripheral edges to which the guide panels 131a~131d are coupled. The LED substrate 122 having the LED PKGs 121 bonded thereto is mounted on the bottom surface of the cover bottom 137. The reflection plate 126 is disposed above the cover bottom 137. The LCD panel 100 and the optical sheets 127 and 128 are laminated and placed on stair-stepped portions inside the upper part of the guide panels 131a~131d, and the case top 133 is coupled to the guide panels 131a~131d. Under this configuration, a single LCD device module is implemented.

Protrusion units 1371 are formed outside each corner of the cover bottom 137 in correspondence to the second branch units 148a and 148b of the coupling member 140. The protrusion units 1371 are provided with grooves 1378a, 1378b, and the protrusions of the second branch unit 148a are inserted into the grooves 1378a, 1378b thus to be coupled to the coupling member 140.

In the LCD device module according to the preferred embodiment of the present invention, the four guide panels partitioned from each other are coupled to the cover bottom, and the optical sheet and the LCD panel are mounted to the stair-stepped portions of the upper part of the guide panel. Under this configuration, no side supporter for mounting the optical sheet is required, and a narrow bezel portion can be implemented. Hereinafter, the structure of the guide panels will be explained in more details with reference to the attached drawings.

Figure 3:
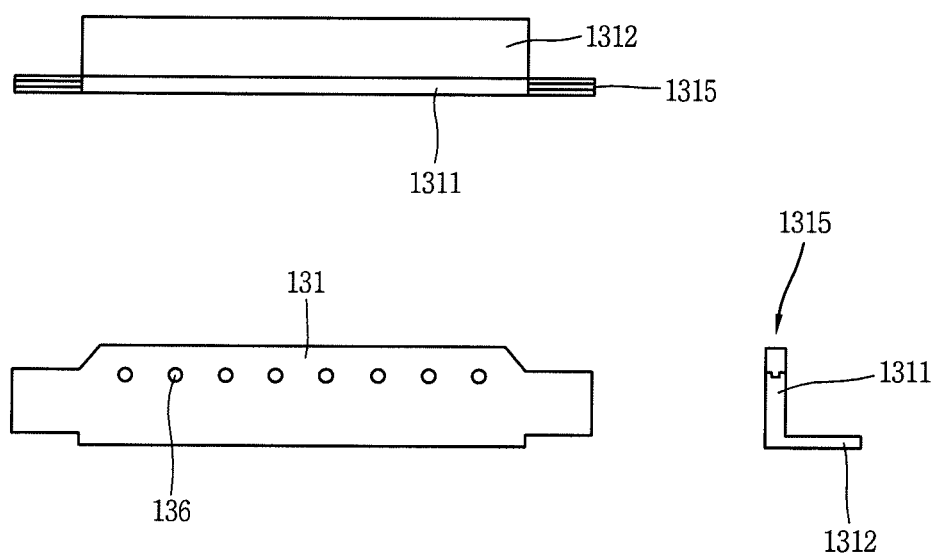
FIG. 3 is a sectional view of an LCD device module according to an embodiment of the present invention.

FIG. 3 is a view showing a single guide panel of the LCD device module according to the preferred embodiment of the present invention.

As shown, the guide panel 131 is formed in a straight-line blade shape when viewed from the front side, and has a narrowed width at each end thereof in a long axis direction. When viewed from the lateral side, the upper surface of the guide panel 131 is provided with grooves 1315 for fitting the first branch units 145a and 145b of FIG. 2. The guide panel includes a first blade unit 1311 perpendicular to the bottom case 137, and a second blade unit 1312 extending from the first blade unit 1311 in a direction perpendicular to the first blade unit 1311.

The grooves 1315 are formed on the upper surface of the first blade unit 1311, and at least one hole 136 for insertion-coupling (for example, screw-coupling) the guide panel with the case top is formed on the front surface and the rear surface of the guide panel. The upper surface of the first blade unit 1311 has a width large enough to support the LCD panel 100 and the optical sheet 127 and 128.

The guide panel 131 is provided in four at a single LCD device module, and the four guide panels 131 enclose the side surfaces of the LCD device module.

Figure 1:
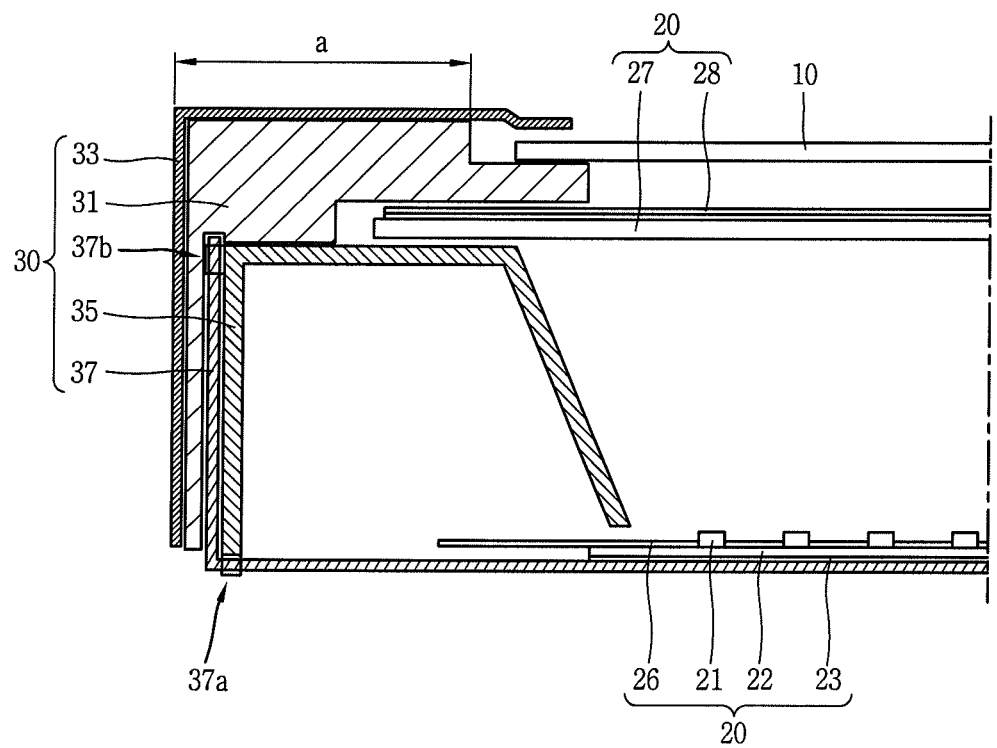
FIG. 1 a sectional view of a liquid crystal display (LCD) device module having a direct type backlight unit provided with a light emitting diode (LED) in accordance with the conventional art.

More specifically, each guide panel 131 includes a first blade unit 1311 having the LCD panel mounted thereon, and configured to guide side surfaces of the LCD device module by being disposed such that side surfaces thereof are perpendicular to the cover bottom; and a second blade unit 1312 extending from the first blade unit 1311 in a bending manner, and coupled to a rear surface of the cover bottom. As four guide panels 131 are coupled to the cover bottom, the entire guide panel is completed to replace the conventional guide panel 31 (refer to FIG. 1).

Under this configuration, the LCD device module of the present invention can require no conventional side supporter for supporting the optical sheet, and can reduce an area occupied by a bezel portion. Hereinafter, the structure of the LCD device module according to the present invention will be explained in more details with reference to the sectional surface of the LCD device module.

Figure 4:
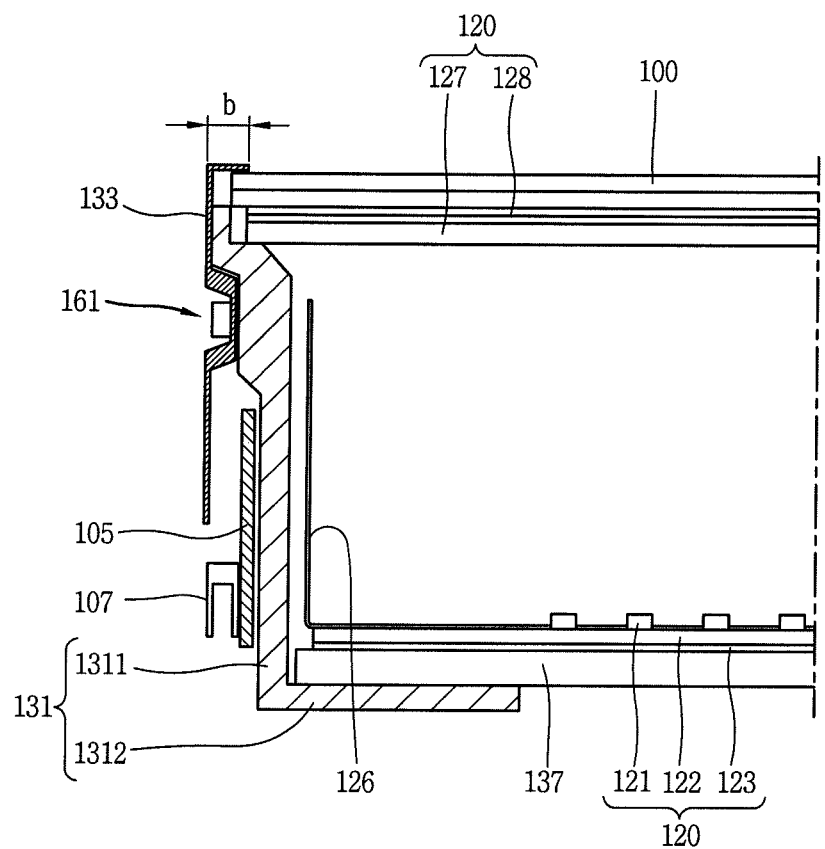
FIG. 4 a disassembled perspective view of an LCD device module according to an embodiment of the present invention.

FIG. 4 is a sectional view of the LCD device module according to the preferred embodiment of the present invention.

As shown, the LCD device module according to the present invention includes an LCD panel 100 for displaying images, a backlight unit 120 disposed below the LCD panel 100, and a mechanical structure 130 coupled to the LCD panel 100 and the backlight unit 120 for implementation of a single LCD device module.

The LCD panel 100 has a structure where an LC layer is interposed between two substrates facing each other and to be attached to each other. As a signal is applied to the LCD panel 100 from a driver unit 105 connected to at least one side surface of the LCD panel 100, light transmittance of the LC layer is controlled to implement image display.

An outer side surface of the LCD panel 100 is coupled to an inner side surface of the guide panel 131 in a contact manner. Under this configuration, the driver unit 105 covers the upper unit of the guide panel 131 for supporting the LCD panel 100, and is disposed on each side surface of the guide panel 131 in an adhered manner. All types of connector 107 of the driver unit 105 has a height lower than that of a case top 133 Accordingly, the side surface of the guide panel 131 more outward-protrudes at a connection unit with the case top 133. That is, the inner peripheral edge of the upper surface of the case top 133 is positioned outer with respect to a display region than the inner side surface of the first blade 1311. Also, the first blade 1311 has a shape in cross section view such that the inner side surface of the upper section is positioned outer than the inner side surface. The backlight unit 120 is disposed on the rear surface of the LCD panel 100, and prism sheets 128 and a diffusion sheet 127 are sequentially disposed close to the LCD panel 100. The diffusion sheet 127 and the prism sheets 128 are disposed on a stair-stepped portion of the upper part of the guide panel 131 in an overlapping manner with the LCD panel 100. The above shape and arrangement regarding the guide panel 131 contribute to the narrow bezel.

The backlight unit 120 includes a plurality of LED PKGs 121 spaced from the prism sheets 128 by a preset distance, an LED substrate 122 on which the LED PKGs 121 are bonded in a plane unit, and a reflection plate 126 disposed above the LED substrate 122 and configured to expose the LED PKGs therethrough.

The backlight unit 120 may further include a double-side tape member 123 disposed on the rear surface of the LED substrate 122, and configured to insulate the LED substrate 122 and the cover bottom 137 from each other and to fix the LED substrate 122.

The mechanical structure 130 includes a guide panel 131, a case top 132 and a cover bottom 137. More specifically, the LCD panel 100 and the optical sheets 127 and 128 are mounted on stair-stepped portions of the guide panel 131, and the guide panel 131 encloses each edge of the LCD panel 100. The guide panel 131 may be formed of a metallic material so as to stably support the LCD panel 100 from movements or an external force, even in an overlapped state with the LCD panel 100 with a width smaller than that of the conventional one.

The guide panel 131 includes a first blade unit 1311 disposed in a direction perpendicular to the LCD panel 100, and supporting the LCD panel and the optical sheets 127 and 128, and a second blade unit 1312 extending from the first blade unit 1311 and bending in a direction perpendicular to the first blade unit 1311, i.e., a direction parallel to a bottom surface of the cover bottom.

The case top 132 is coupled to the upper unit of the LCD panel 100. And, the case top 132 is configured to fix the LCD panel 100 and the optical sheets 127 and 128 together with the guide panel 131, and to enclose the side surfaces of the guide panel 131. Especially, the case top has holes formed as unit of the side surfaces of the case top is inward concaved, and the guide panel 131 has holes corresponding to the holes of the case top. Accordingly, the case top and the guide panel can be stably insertion-coupled (for example, screw-coupled) to each other via the holes.

On an inner bottom surface of the cover bottom 137, the LED substrate 122 of the backlight unit 120 is mounted. The second blade unit 1312 of the guide panel 131 is engaged with an outer rear surface of the cover bottom 137.

The cover bottom 137 is implemented as a single metallic plate. Although not shown, the cover bottom 137 may be fixed by using bolts and nuts at contact parts to the guide panel 131, or may be fixed in a riveting manner.

In the LCD device module of the present invention, an outer peripheral portion where no image is displayed, i.e., a non-display region has a width (b) of 1.5 mm~2.5 mm. And, when compared with the conventional art, a bezel portion of 5%~7% is implemented. Further, the area of the region where the LC panel 100 and the case top are overlapped is preferably 40%~50% of the area of the upper surface of the case top 133. Thereby, the LCD panel 100 is ensured to be held or fixed by the case top 133.

The foregoing embodiments and advantages are merely exemplary and are not to be construed as limiting the present invention. The present teachings can be readily applied to other types of apparatuses. For example, although the above embodiment discloses that the guide panels for four sides comprises four separate guide panels, any two or three of the four guide panels may be integrated. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without deuniting from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device module, comprising:
    a liquid crystal display (LCD) panel having a light emitting surface and a rear surface;
    a backlight unit disposed on a rear surface side of the LCD panel and including an LED substrate on which LEDs are mounted;
    a cover bottom including a bottom surface, on which the LED substrate is mounted, and a plurality of protrusion units protruding outward from each corner of the bottom surface, each protrusion unit having grooves;
    a plurality of guide panels coupled to peripheral edges of a rear surface of the cover bottom and supporting the peripheral edges of the rear surface of the LCD panel;
    a plurality of coupling members each inserted into a gap between ends of two neighboring guide panels to fix the two neighboring guide panels; and
    a case top enclosing outer surfaces of the guide panels and covering the peripheral edges of the emitting surface of the LCD panel,
    wherein each corner of the bottom surface of the cover bottom corresponds to ends of two guide panels and grooves of one of the protrusion units, and
    wherein the coupling member includes:
    a body unit in a straight-line shape;
    a plurality of first branch units perpendicularly extending from an upper portion of the body unit for coupling the guide panels; and
    a plurality of second branch units perpendicularly extending from a lower portion of the body unit for coupling the cover bottom, the second branch units having protrusions to be inserted into the grooves of one of the protrusion units in the cover bottom.

2. The LCD device module of claim 1, wherein the guide panels include:
    a first blade unit on which the LCD panel is placed and whose side surfaces are disposed vertically to the cover bottom to support each peripheral edge of the LCD panel; and
    a second blade unit extended from the first blade unit and bent inward the LCD device module to couple a rear surface of the cover bottom.

3. The LCD device module of claim 2, wherein an inner peripheral edge of an upper surface of the case top is positioned outer than an inner side surface of the first blade.

4. The LCD device module of claim 2, wherein an inner side surface of an upper section of the first blade is positioned outer than an inner side surface of a lower section of the first blade.

5. The LCD device module of claim 4, wherein an upper inner side surface of the first blade is provided with a step, and a peripheral edge of the LCD panel is arranged over the step.

6. The LCD device module of claim 2, wherein the first blade unit has at least one hole on a side surface thereof for insertion-coupling with the case top.

7. The LCD device module of claim 2, wherein upper surfaces of both ends of the first blade unit have concave convex groove.

8. The LCD device module of claim 1, wherein an upper surface of the case top has a width of 1.5 mm~2.5 mm.

9. The LCD device module of claim 1, wherein an overlapped area of the LCD panel and the case top is 40%~50% of an area of the upper surface of the case top.

10. The LCD device module of claim 1, wherein the backlight unit includes:
    a plurality of LED PKGs (Light Emitting Diode Packages);
    the LED substrate on which the LED PKGs are mounted;
    a reflection plate disposed above the LED substrate the reflection plate having a plurality of holes to expose the LED PKGs there through; and
    an optical sheet for diffusing and collecting light emitted from the LED PKGs,
    wherein the optical sheet is disposed on a rear surface of the LCD panel and supported by steps provided on upper inner surfaces of the guide panels.

11. The LCD device module of claim 1, wherein the protrusion units protrude in parallel with the bottom surface.

* * * * *